No. 608,591. Patented Aug. 9, 1898.
G. GANTS.
DINNER PAIL.
(Application filed July 11, 1896.)
(No Model.)
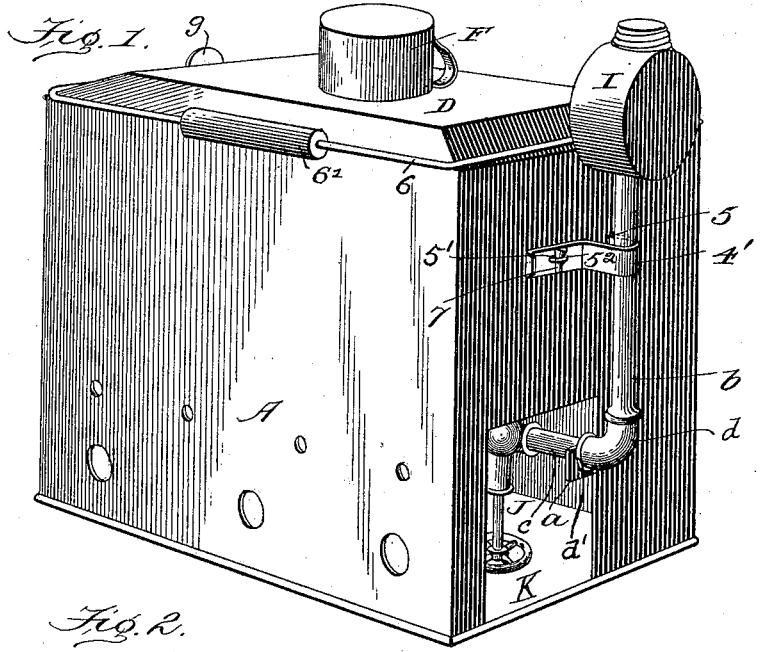
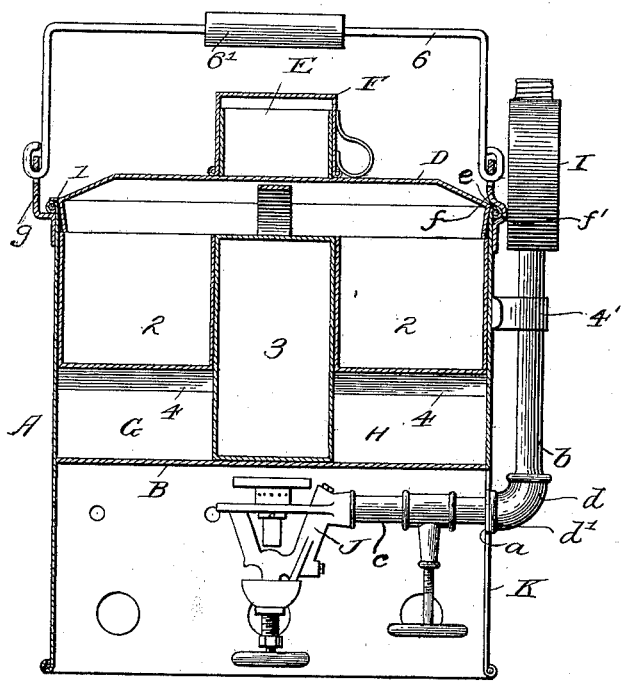
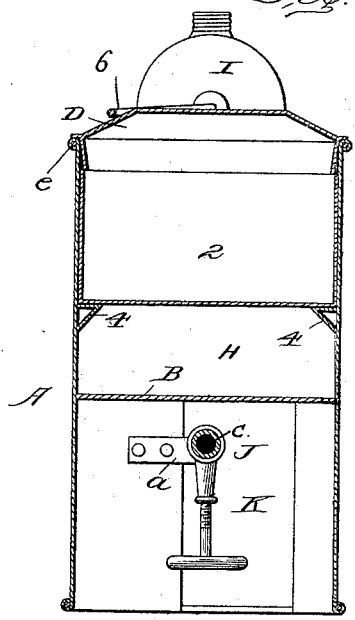
WITNESSES:
Edwin L. Bradford
E. Hade. Ball
INVENTOR
George Gants
BY R.S. & A.P. Gaery
ATTORNEYS

UNITED STATES PATENT OFFICE.

GEORGE GANTS, OF GREENFIELD, OHIO.

DINNER-PAIL.

SPECIFICATION forming part of Letters Patent No. 608,591, dated August 9, 1898.

Application filed July 11, 1896. Serial No. 598,859. (No model.)

*To all whom it may concern:*

Be it known that I, GEORGE GANTS, a citizen of the United States, and a resident of Greenfield, in the county of Highland and State of Ohio, have invented certain new and useful Improvements in Dinner-Pails; and I do hereby declare the following to be a full, clear, and exact description of the invention, such as will enable others skilled in the art to which it appertains to make and use the same, reference being had to the accompanying drawings, forming a part of this specification.

My invention relates to certian new and useful improvements in dinner-pails; and the object is to provide a simple and convenient device of this kind; and to this end the invention consists in the novel constructions, combinations, and arrangements of parts hereinafter more fully described, and particularly pointed out in the appended claims.

In the accompanying drawings the same reference characters indicate the same parts of the invention.

Figure 1 is a perspective view of my improved dinner-pail. Fig. 2 is a longitudinal section of the same. Fig. 3 is a transverse sectional view.

A represents a rectangular casing provided with a removable cover D and a detachable drinking-cup F. The cover D is formed with a projecting bead or flange $e$, which extends over the walls of the mouth of the pail, and, as shown in Fig. 2, this bead projects into a horizontal groove $f'$ in the fixed ear $f$, the upper edge of the groove extending over the bead or flange $e$ and forming a lock-hinge for this end of the cover, which requires that the opposite edge of the cover be raised first, the ear $g$ being formed vertical for this purpose.

6 represents the wire bail, pivoted at its opposite ends to said ears $f$ and $g$, and it is provided with the usual revolving handle 6'.

B represents a horizontal diaphragm or partition separating the casing into two compartments, and 3 is a covered removable rectangular liquid-receptacle for soup, coffee, tea, and the like, which rests upon said diaphragm, which forms the bottom of the casing. 4 4 represent longitudinal guide-flanges secured to the sides of the casing A on each side of the liquid-receptacle 3. These flanges form a support for the removable open-top food-receptacles 2 2, one of which is located on each side of the covered liquid-receptacle 3, whereby two separate compartments G and H are formed in the upper portion of the casing, one at each side of the receptacle 3 and extending from the fixed bottom B to the bottoms of the removable food-receptacles 2 2. These chambers constitute dead-air chambers, and the object of the same is that the food in receptacle 3 may be heated to a high temperature, while that in receptacles 2 is simply warmed, the operation being performed by bringing said receptacle 3 in contact with the fixed bottom or diaphragm B and in providing the dead-air chambers between said diaphragm and receptacles 2, as above set forth.

I represents the detachable liquid-fuel reservoir, provided with a supply-pipe having a vertical section $b$, secured to one end of the casing A by a bracket 5, having a hinged strap 4', which encompasses the pipe-section $b$ and is provided at its free end with a slot 5', through which projects a fixed staple $5^2$ on the end of the casing, and a removable pin or key 7 serves to detachably secure said strap in place.

The base of the casing below the diaphragm or partition B is bottomless and is provided at one end with an opening K, through which the horizontal section $c$ of the liquid-fuel-supply pipe projects. The inner end of this pipe-section $c$ carries a burner J and is provided with a controlling-cock, and the outer end thereof rests in a recess in the free end of a bracket-arm $a$, secured to the end wall of the casing, as shown. The said vertical and horizontal sections $b$ $c$ of the supply-pipe are united adjoining the opening K by an elbow $d$, having a fixed collar $d'$ at its lower and inner end, which abuts against the said bracket-arm $a$ and supports the said two sections of the pipe in proper relation. A feature of this construction and arrangement of parts is that the burner J is located immediately under the center of the bottom B, and therefore while the main source of heat is directly under the liquid-receptacle the outer edge of the flame also has its effect on the compartments G and H.

Another feature of the construction and arrangement as above set forth is that the receptacles 2 2 protect the walls of the liquid-receptacle, which in turn imparts a portion of its heat to them to keep their contents at a proper temperature.

Another novel feature is that by removing the liquid-receptacle 3 and the two receptacles 2 2 the whole interior of the pail is converted into a single large compartment in which water may be boiled to wash the pail and its removable receptacles after use, or a soup or stew may be conveniently cooked in it.

Having thus fully described my invention, what I claim as new and useful, and desire to secure by Letters Patent of the United States, is—

1. An improved dinner-pail comprising a casing having a fixed diaphragm dividing said casing into an upper and a lower compartment, a burner situated centrally in the lower compartment with the flame therefrom impinging upon the diaphragm, horizontally-extending parallel flanges on the side walls of the casing within the upper compartment, said flanges extending from the respective ends of the casing to a point adjacent the center thereof, but terminating short of each other to form a central opening, a receptacle removably positioned in said central opening and seated upon the diaphragm, and receptacles positioned upon the flanges on each side of the central receptacle and in direct contact therewith, said receptacles and diaphragm forming dead-air chambers beneath said receptacles and on each side of the central receptacle, substantially as described.

2. A dinner-pail comprising a casing having an upper and a lower compartment, the latter having an opening in one of its end walls, an oil-receptacle on the exterior of the casing provided with a delivery-pipe having a vertical section $b$ extending parallel with the end wall of the casing and a horizontal section $c$ projecting through said opening and carrying a burner which is accessible through the opening, a hinged strap encompassing the vertical section of the delivery-pipe and securing the same to the casing, means for securing the free end of the strap, a bracket-arm $a$ having a slot for the reception of the horizontal section of the delivery-pipe, and an elbow $d$ uniting the vertical and horizontal sections of said delivery-pipe and having a collar $d'$ abutting against the outer surface of said bracket-arm, whereby the pipe is held supported in proper position, substantially as described.

GEORGE $\underset{\text{mark}}{\overset{\text{his}}{\times}}$ GANTS.

Witnesses:
C. W. SCOTT,
C. N. PATTERSON.